United States Patent
Richards

(10) Patent No.: US 7,281,720 B1
(45) Date of Patent: Oct. 16, 2007

(54) DRUM TRANSPORT CART

(76) Inventor: Robert M. Richards, 1592 Partridge La., Waterloo, IA (US) 50701

( * ) Notice: Subject to any disclaimer, the term of this patent is extended or adjusted under 35 U.S.C. 154(b) by 0 days.

(21) Appl. No.: 11/434,956

(22) Filed: May 16, 2006

(51) Int. Cl.
B62B 3/00 (2006.01)
(52) U.S. Cl. .................. 280/79.5; 280/79.11; 280/79.2
(58) Field of Classification Search ............... 280/79.5, 280/79.11, 79.2
See application file for complete search history.

(56) References Cited

U.S. PATENT DOCUMENTS

| | | | | | |
|---|---|---|---|---|---|
| 523,520 | A | * | 7/1894 | Goldensky ............... | 280/79.11 |
| 3,024,036 | A | * | 3/1962 | Reynolds .................. | 280/79.11 |
| 3,898,898 | A | * | 8/1975 | Peres ........................... | 82/47 |
| 3,902,576 | A | * | 9/1975 | Pitan et al. ................. | 188/82.7 |
| 4,127,202 | A | * | 11/1978 | Jennings et al. ............. | 414/537 |
| 5,143,389 | A | * | 9/1992 | Jonkers .................... | 280/47.26 |
| 5,758,888 | A | * | 6/1998 | Burgan et al. ........... | 280/47.34 |
| 6,453,508 | B1 | * | 9/2002 | Denner ........................ | 16/35 R |
| 6,682,084 | B2 | * | 1/2004 | Webster et al. ............ | 280/79.5 |
| 6,863,489 | B2 | * | 3/2005 | Grubbs et al. .............. | 414/458 |
| 6,880,837 | B2 | * | 4/2005 | Nandram et al. ........ | 280/79.11 |

OTHER PUBLICATIONS

W.W.Grainger,Inc., Lake Forest, IL: http://www.grainger.com/Grainger/wwg/productIndex.shtml?originalValue=Dolly&L2=Barrel+Drum&operator=prodIndexRefinementSearch&L1=Dollies%2.
W.W.Grainger Inc., printout from website catalog, part No. 3PA33 Bogie, Drum, 9 1/2 in.
W.W.Grainger Inc., printout from website catalog, part No. 3W039 Dolly, Drum, welded steel, 4 casters.
W.W.Grainger Inc., printout from website catalog, part No. 5W562 Dolly, Drum, solid bottom.
W.W. Grainger Inc., printout from website catalog, part No. 4YV53, welded steel, 5 caster.
W.W.Grainger Inc., printout from website catalog, part No. 4F987 Grease Pump Drum Dolly.
W.W.Grainger Inc., printout from website catalog, part No. 3KN27 Dolly, Workstation.
W.W.Grainger Inc., printout from website catalog, part No. 5ME99, Drum Dolly, 900 lb cap.
W.W.Grainger Inc., printout from website catalog, part No. 6W854 Truck, Drum, 800 lb.
Pucel Enterprises, Inc., Cleveland Ohio: http://www.pucel-grizzly.com/drums.htm.
Pucel Enterprises, Inc; 3 page printout from online catalog for "Drum and Can Handling".

* cited by examiner

Primary Examiner—Christopher P. Ellis
Assistant Examiner—John D Walters
(74) Attorney, Agent, or Firm—Allan L. Harms; Wenzel & Harms, P.C.

(57) ABSTRACT

A drum dolly on which an upright drum may be placed. A C-shaped frame is supported on side members which are each supported on front and rear casters. The frame includes a support ledge to receive the rim of the drum. The underside of the support ledge is positioned slightly above the floor. The bottom of a drum to be transported is moved onto the frame through its open side while the drum is tipped slightly.

11 Claims, 3 Drawing Sheets

DRUM TRANSPORT CART

BACKGROUND

Figure 1:
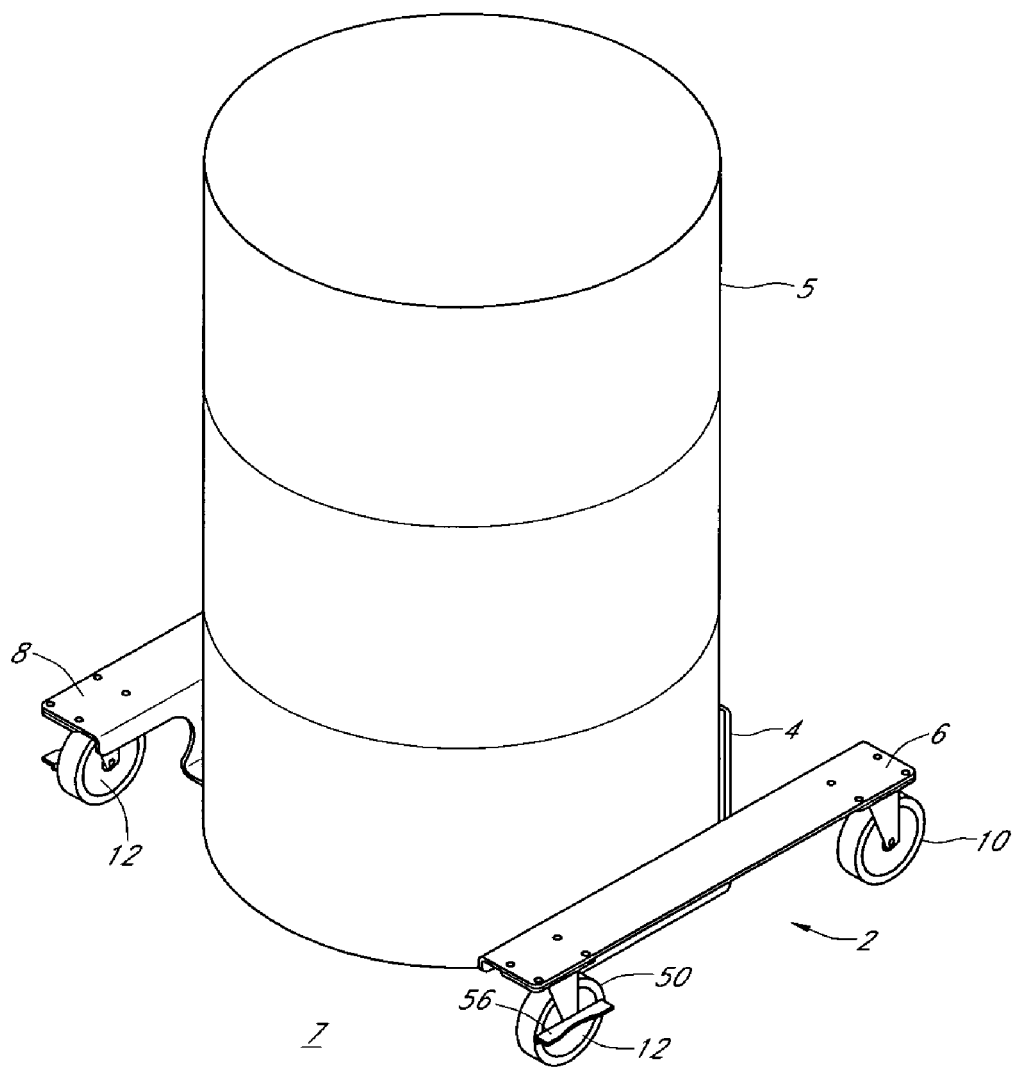

The field of this invention is transport devices for barrels and drums, particularly non-motorized wheeled carts that can support a filled fifty-five gallon or other capacity barrel or drum. Reference to "drum" in this disclosure shall include barrel containers as well.

Existing non-motorized transport devices for drums include carts and dollies that have a horizontal base supported on four casters, the base having an upright rim or lip to prevent the drum from sliding off the base. Such devices allow the drum to be lowered onto the cart and to be manually moved around the work place. Some existing devices include towing handles pivotally fixed to the base.

In the use of devices of this sort, the drum must be hoisted upward to allow the cart to be placed below the drum and then the drum lowered onto the cart within the confines of the rim or upstanding lip.

Another device for transport of an upright drum is a standard two-wheeled hand truck having a platform onto which the drum is moved so that the hand truck can be tipped to support the drum on the wheels of the hand truck while the drum is moved.

Because a hand truck is a versatile device useful to transport various objects, when a drum is to be moved, the laborer likely must locate and retrieve the hand truck from wherever it may be located, a disadvantage. It is also known that worker injuries arise from use of two-wheeled hand trucks, such as when the worker loses control of the hand truck, causing the center of gravity of the tipping load to move to the user's side of the fulcrum defined by the wheels on the ground surface. This is an additional disadvantage to use of a two-wheeled hand truck to move a drum.

In other existing devices, the drum is transported while lying on its sidewall.

A drum dolly which remains with the drum and which may be loaded without lifting of the drum is a needed improvement.

SUMMARY

The present invention is an improved dolly for manual transport of an upright industrial drum. An open-sided frame defines a shelf in the general shape of a "C". The frame is supported by side members which are elongate and which are supported at their ends by casters. The support arrangement of the frame on the side members allows the shelf to be suspended only a small distance above the ground surface. The open sided frame includes an upright sidewall that serves as a restraint to assist in positioning the drum on the dolly. To place a drum on the dolly invention, the drum need only be tipped sufficiently to allow the frame to be partially slid beneath the drum. Then the drum can be forced to an upright orientation as the dolly is further slid below the drum until the bottom of the drum touches the sidewall of the frame. Then the drum may be moved about the workplace by manual effort while remaining upright and stably supported on the dolly.

Accordingly objects of the invention are (a) to provide an easily loaded drum transport dolly; (b) to provide an inexpensive transport dolly which can remain with the drum until it has been emptied; (c) to provide a simple drum transport dolly which does not require the drum to be raised off the floor surface on which it rests; (d) to provide a drum dolly which allows the drum to be easily moved while remaining in an upright orientation.

These and other objects of the invention will be apparent from review of the detailed description which follows.

BRIEF DESCRIPTION OF THE SEVERAL VIEWS OF THE DRAWING(S)

Figure 2:
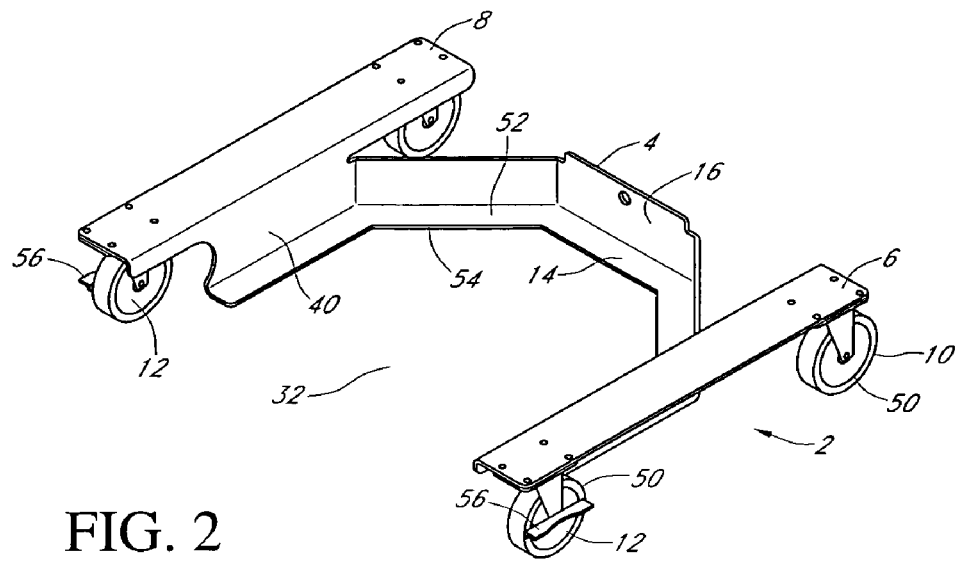
Figure 3:
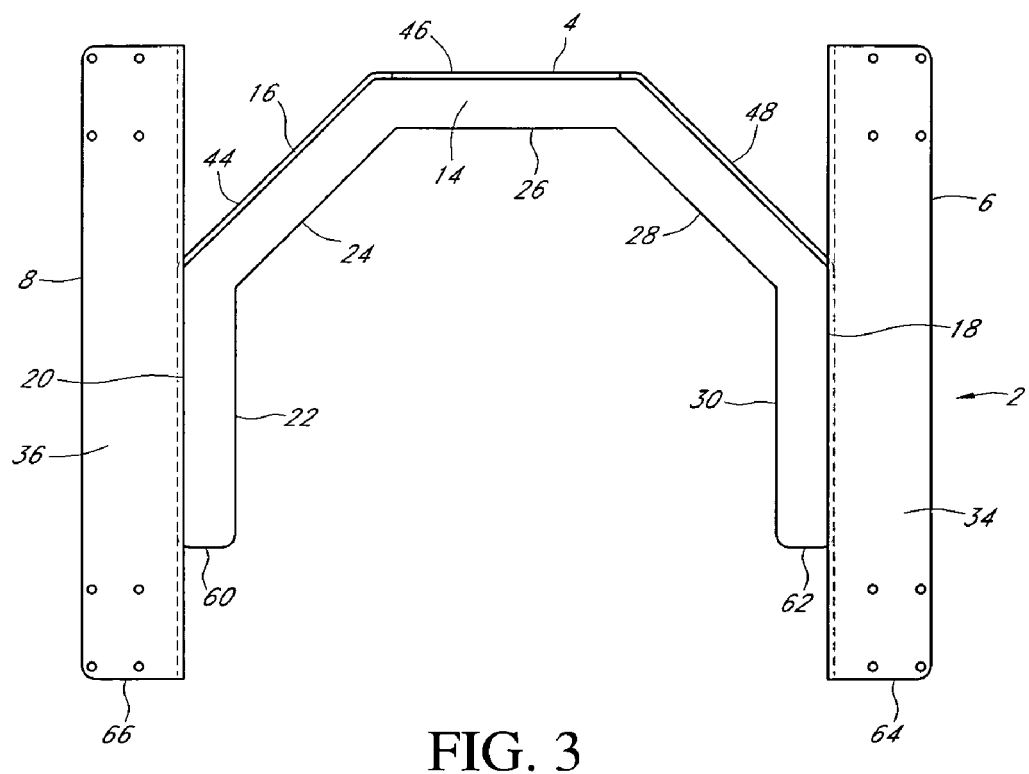
Figure 4:
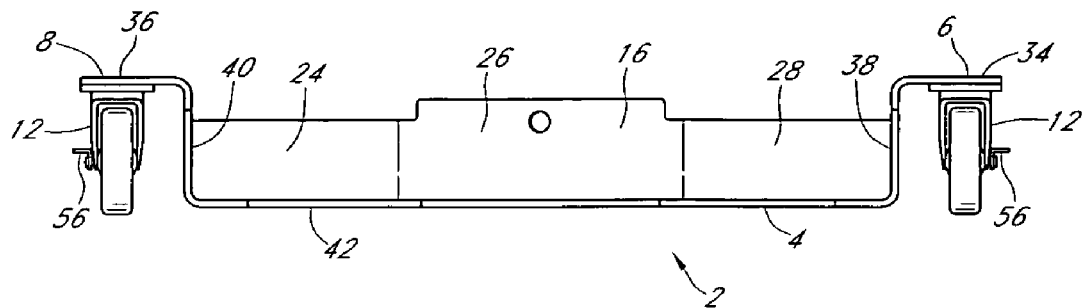
Figure 5:
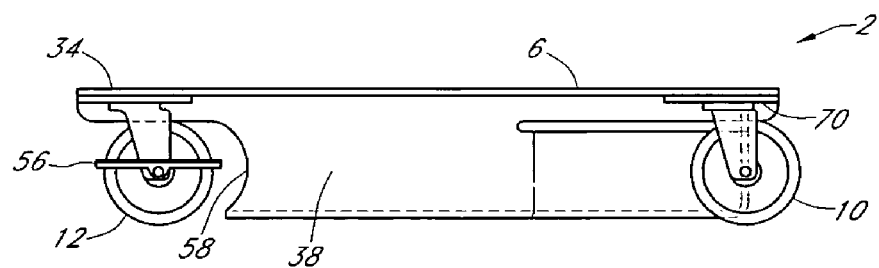

FIG. 1 is a perspective of an upright drum supported on the invention.
FIG. 2 is a perspective of the invention.
FIG. 3 is a top plan view of the invention.
FIG. 4 is a front elevation of the invention.
FIG. 5 is a side plan view of the invention.

DETAILED DESCRIPTION OF THE INVENTION

Referring to the figures and particularly to FIG. 1, an upright drum 5 is shown supported on invention dolly 2 ready for movement over floor surface 7. Invention dolly 2 can be seen to comprise frame 4 joined to opposing side members 6, 8 each of which is supported upon casters 10, 12. Rear casters 10 are capable of swivel operation while front casters 12 are fixed in direction. Front casters 12 may be provided with caster locks 56 which may be employed selectively to prevent rotation of front caster wheels 50.

Referring now additionally to FIGS. 2-5, additional detail of invention dolly 2 may be visualized. Frame 4 includes linear segments 22, 24, 26, 28, 30 which are joined in series such that frame 4 is C-shaped, having an open side 32. Side members 6, 8 are fixed to frame 4 at opposing sides 18, 20 thereof such that side members 6, 8 are generally parallel to each other. Frame 4 includes a ledge 14 and upright sidewall 16.

Each of members 6, 8 includes a top plate 34, 36 with a depending side flanges 38, 40 joined generally perpendicularly to top plates 34, 36 respectively. Side flanges 38, 40 are each provided with a front recess 58 which may be semi-circular.

Ledge 14 of frame 4 has a top surface 52 on which a bottom rim of a drum such as drum 5 of FIG. 1 may rest. Because frame 4 comprises linear segments, ledge 14 comprises segments as well, though ledge 14 could define a continuous circular inside edge 54.

Sidewall 16 of frame 4 comprises wall elements 44, 46 and 48 of linear segments 24, 26, and 28 respectively. Side flanges 38, 40 cooperate with wall elements 44, 46, and 48 to define upright sidewall 16. Upstanding wall element 46 is slightly taller than adjoining wall elements 44 and 48.

In FIG. 3 it can best be seen that top plates 34, 36 of side members 6, 8 extend rearward at least to alignment with wall element 46 of segment 26 of frame 4.

Side flanges 38, 40 of side members 6, 8 are substantially shorter in longitudinal length than top plates 34, 36 of side member 6, 8 because reduction in weight and materials of dolly 2 is desired and side flanges 38, 40 are primarily functional to provide horizontal boundaries for a drum placed on frame 4.

It is also seen particularly in FIG. 3 that ledge 14 extends forward of sidewall 16 and side flanges 38, 40 approximately two to three inches though ledge 14 could extend across frame 4 from side flange 38 to opposing side flange 40.

Casters 10, 12 are selected to be of generally identical height so that side members 6, 8 will be level when resting on casters 10, 12. Selection of the size of casters 10, 12 is made such that the underside 42 of frame 4 is supported above the floor surface only a small distance, that is, in the range of one-fourth inch to two inches. Front casters 12 are single direction casters locked in place to rotate in the longitudinal directions of sidewalls 6, 8. In contrast, rear casters 10 include turntables 70 which allow rear caster 10 to swivel over a 360-degree range.

Though the preferred embodiment of FIGS. 1-5 include a frame 4 made of linear segments 22, 24, 26, 28, and 30, it is to be understood that segments 24, 26, and 28 could be substituted with a curvilinear segment joined at opposing ends to side members 6, 8.

In practice it is found that side members 6, 8 may be spaced apart about twenty-four inches to accommodate placement of a fifty-five gallon drum between side flanges 38, 40. Top plates 34, 36 of side members are preferably about twenty-four inches long with the front edges 60, 62 of ledge 14 spaced rearward of front edges 64, 66 of top plates 34, 36 about five inches.

The height of sidewall 16 is nominally three to four inches with one-quarter inch thick steel used from side members 6, 8 and frame 4.

The size of open side 32 and the separation spacing of side members 6, 8 would be modified if drums of size other than fifty-five gallon capacity were to be transported.

The foregoing description of the invention has been presented for purposes of illustration and description and is not intended to be exhaustive or to limit the invention to the precise form disclosed. Modifications and variations of the embodiments are possible in light of the above disclosure or such may be acquired through practice of the invention. The embodiments illustrated were chosen in order to explain the principles of the invention and its practical application to enable one skilled in the art to utilize the invention in various embodiments and with various modifications as are suited to the particular use contemplated. It is intended that the scope of the invention be defined by the claims appended hereto, and by their equivalents.

Having described the invention, I claim:

1. A transport dolly for a drum comprising
a c-shaped frame supported on opposing elongate side members,
each side member supported on at least two casters mounted thereto,
the frame comprising an open side defined by the side members,
the frame comprising a series of at least four linear segments,
the frame further comprising a closed side opposing the open side thereof,
the frame including a generally horizontal ledge,
the frame sized to receive a bottom of the drum through the open side thereof such that a bottom rim of the drum will rest on the ledge.

2. Drum transport apparatus comprising
a C-shaped open frame disposed generally horizontally and supported by spaced apart elongate side members mounted to opposing sides of the frame,
the frame comprising a series of at least four linear segments,
each side member having opposing ends,
at least one caster located generally adjacent each end of each side member,
the frame comprising a generally horizontally disposed ledge extending along an interior periphery of the frame,
whereby an upright drum may be supported on the ledge of the frame.

3. The drum transport apparatus of claim 2 wherein
each side member comprises a substantially horizontal top plate and a side flange depending substantially perpendicularly therefrom,
each side flange coincident with a portion of an upright sidewall upstanding on the ledge of the frame.

4. The drum transport apparatus of claim 2 wherein
the frame comprises opposing end segments,
the opposing end segments joined to side flanges depending from a top plate of each side member,
the frame comprising an upright wall on an exterior periphery thereof.

5. The drum transport apparatus of claim 2 wherein
the frame includes an upright wall upstanding from an exterior periphery thereof,
the ledge comprising a series of linear segments,
the series of linear segments comprising opposing end segments,
each side member comprising a substantially horizontal top plate and a side flange depending substantially perpendicularly therefrom,
each of the opposing end segments joined to a one of the side flanges,
the side members substantially parallel,
each side flange coincident with a portion of the upright sidewall.

6. The drum transport apparatus of claim 5 wherein
the opposing ends of each side member are a front end and a rear end,
a first caster located generally adjacent the front end of each side member,
each first caster comprising locking means to prevent rotation of a caster wheel thereof,
a second caster located generally adjacent the rear end of each side member,
each second caster rotatable about a vertical axis thereof.

7. Apparatus to transport a drum comprising
a C-shaped frame disposed generally horizontally and supported by linear side members mounted to opposing sides of the frame,
each side member supported on at least two casters,
each side member having a front end and an opposing rear end,
the C-shaped frame having a rear,
the rear end of each side member extending rearward beyond the rear of the C-shaped frame,
the frame comprising a ledge extending along a periphery of the frame,
whereby the drum may be supported upon the ledge of the frame.

8. The apparatus of claim 7 wherein
the C-shaped frame comprises a series of at least four linear segments.

9. The apparatus of claim 7 wherein
a first caster is located generally adjacent the front end of each side member,
each first caster comprising locking means to prevent rotation of a caster wheel thereof,
a second caster located generally adjacent the rear end of each side member,
each second caster rotatable about a vertical axis thereof.

10. Drum transport apparatus comprising
a C-shaped frame disposed substantially horizontally and supported by spaced apart elongate side members mounted to opposing sides of the frame, the frame comprising a series of at least four linear segments, each side member supported on at least two casters, the frame comprising a generally horizontally disposed ledge extending along an interior periphery of the frame, whereby an upright drum may be supported on the ledge of the frame.

11. The drum transport apparatus of claim 10 wherein the frame includes an upright wall upstanding from an exterior periphery thereof, the series of at least four linear segments comprising opposing end segments, each side member comprising a substantially horizontal top plate and a side flange depending substantially perpendicularly therefrom, each of the opposing end segments joined to a one of the side flanges, a series of three intermediate linear segments interconnecting the end segments, the side members substantially parallel, each side flange coincident with a portion of the upright sidewall.

* * * * *